United States Patent
Lee et al.

(10) Patent No.: US 6,790,268 B2
(45) Date of Patent: Sep. 14, 2004

(54) INKS HAVING HIGH MOLECULAR WEIGHT POLYSACCHARIDES

(75) Inventors: Shirley Lee, Poway, CA (US); Grant A. Webster, Valley Center, CA (US); Joe R. Pietrzyk, deceased, late of San Diego, CA (US), by Susan L. Pietrzyk, legal representative; Farzaneh Barmaki, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 277 days.

(21) Appl. No.: 10/084,400

(22) Filed: Oct. 24, 2001

(65) Prior Publication Data

US 2003/0079646 A1 May 1, 2003

(51) Int. Cl.$^7$ ............................................. C09D 11/02
(52) U.S. Cl. ................................ 106/31.36; 106/31.68; 106/31.58; 106/31.86
(58) Field of Search .......................... 106/31.36, 31.68, 106/31.58, 31.86; 347/100

(56) References Cited

U.S. PATENT DOCUMENTS

| | | | |
|---|---|---|---|
| 4,836,851 A | 6/1989 | Powlowski et al. | |
| 5,108,504 A | 4/1992 | Johnson et al. | |
| 5,114,477 A | 5/1992 | Mort et al. | |
| 5,129,948 A | 7/1992 | Breton et al. | |
| 5,133,803 A | 7/1992 | Moffatt | |
| 5,164,232 A | 11/1992 | Henseleit et al. | |
| 5,207,825 A | 5/1993 | Schwartz, Jr. | |
| 5,211,747 A | 5/1993 | Breton et al. | |
| 5,223,026 A | 6/1993 | Schwarz, Jr. | |
| 5,226,957 A | 7/1993 | Wickramanayake et al. | |
| 5,242,489 A | 9/1993 | Schwarz, Jr. | |
| 5,254,158 A | 10/1993 | Breton et al. | |
| 5,254,159 A | 10/1993 | Gundlach et al. | |
| 5,256,193 A | 10/1993 | Winnik et al. | |
| 5,258,064 A | 11/1993 | Colt | |
| 5,300,143 A | 4/1994 | Schwarz, Jr. | |
| 5,324,349 A | 6/1994 | Sano et al. | |
| 5,340,388 A | 8/1994 | Breton et al. | |
| 5,345,254 A | 9/1994 | Wong et al. | |
| 5,360,472 A | 11/1994 | Radigan, Jr. et al. | |
| 5,389,131 A | 2/1995 | Colt et al. | |
| 5,389,133 A | 2/1995 | Gundlach et al. | |
| 5,389,134 A | 2/1995 | Breton et al. | |
| 5,503,664 A | 4/1996 | Sano et al. | |
| 5,833,744 A | * 11/1998 | Breton et al. ............ | 106/31.59 |
| 5,851,274 A | * 12/1998 | Lin ......................... | 106/31.43 |
| 5,973,026 A | * 10/1999 | Burns et al. ................ | 523/160 |
| 5,997,623 A | * 12/1999 | Lin ......................... | 106/31.58 |
| 6,231,653 B1 | * 5/2001 | Lavery et al. ........... | 106/31.36 |
| 6,231,655 B1 | * 5/2001 | Marritt .................... | 106/31.58 |
| 6,306,204 B1 | * 10/2001 | Lin ......................... | 106/31.43 |
| 6,379,441 B1 | * 4/2002 | Kanaya et al. ........... | 106/31.49 |
| 6,498,222 B1 | * 12/2002 | Kitamura et al. ........ | 526/307.2 |
| 6,500,248 B1 | * 12/2002 | Hayashi .................. | 106/31.86 |
| 2001/0032566 A1 | * 10/2001 | Yatake .................... | 106/31.58 |
| 2002/0121220 A1 | * 9/2002 | Lin ......................... | 106/31.27 |

* cited by examiner

*Primary Examiner*—Mark L. Bell
*Assistant Examiner*—Veronica F. Faison

(57) ABSTRACT

The present invention is drawn to ink-jet ink compositions, methods, and systems for reducing satellite spotting around a printed image. Specifically, an aqueous ink-jet ink composition exhibiting a reduction in aerosol formation during printing, comprises an effective amount of an ink vehicle; an effective amount of at least one ink colorant; and from 5 to 200 ppm of a high molecular weight polysaccharide.

20 Claims, No Drawings

INKS HAVING HIGH MOLECULAR WEIGHT POLYSACCHARIDES

FIELD OF THE INVENTION

The present invention is directed to aqueous ink-jet ink compositions having reduced aerosol resulting in less satellite spotting as well as a method for printing images with an ink-jet ink having reduced aerosol and satellite spotting.

BACKGROUND OF THE INVENTION

In recent years, computer printer technology has evolved to a point where very high-resolution images can be transferred to various types of media, including paper. One particular type of printing (referred to generally as ink-jet printing) involves the placement of small drops of fluid ink onto a media surface in response to a digital signal. Typically, the fluid ink is placed or jetted onto the surface without physical contact between the printing device and the surface. Within this general technique, the specific method by which the ink-jet ink is deposited onto the printing surface varies from system to system, and can include continuous ink deposit and drop-on-demand ink deposit.

Essentially, continuous printing systems function as a stream of ink droplets are ejected and directed by the printer nozzle. The ink droplets are directed with the assistance of an electrostatic charging device in close proximity to the nozzle. In a continuous printing system, if the ink is not directed onto the print media, it is recycled for later use. Similarly, in drop-on demand printing systems, the ink-jet inks are typically based upon water and glycols. With drop-on-demand systems, ink droplets are propelled from a nozzle by heat or by a pressure wave. Additionally, all of the ink droplets formed are used to form printed images.

Low cost and high quality of output, combined with relatively noise free operation, have made ink-jet printing a popular alternative to other computer related forms of printing. However, even though great improvement in ink-jet printing has been made, demand for higher quality ink-jet printing systems has arisen. Presently, regardless of the method employed to eject ink from an ink-jet printer, a common problem experienced in ink-jet printing is the disintegration of an ejected ink droplet such that certain portions of the original ink droplet do not reach the intended position on the print media. More specifically, problems arise related to the generally known fact that an ink droplet ejected by an ink-jet printer forms a head portion and a tail portion upon ejection. Often, the tail portion of an ejected ink droplet will become susceptible to random aerodynamic forces and will fragment into smaller volumes of ink. These small volumes of ink are commonly referred to as break off remnants, and can become misdirected, thereby failing to deposit at the intended location on the print media along with the intact head portion of the ejected ink droplet. Exacerbating the above mentioned misdirection of ink, such break off remnants are often small enough that their trajectory can be further altered by random aerodynamic forces. Break off remnants are known collectively as aerosol and, when misdirected, individual break off remnants of the aerosol form what are commonly referred to as satellite drops, which can form satellite spotting on the print media.

The formation of aerosol and resultant satellite drops are an undesirable occurrence during the ink-jet printing process. This is in part because control over the final position of an ejected ink droplet on the print media is effectively withdrawn from the control of the printer microprocessor and diverted to random aerodynamic forces, thereby reducing the over all sharpness and definition of the image or character being printed. Additionally, aerosol negatively affects print quality by diminishing the amount of ink directed to create a particular image, area fill, or other pattern.

Not all break off remnants that can create satellite spotting are misdirected. Typically, in order for a break off remnant to be misdirected, it generally must be small enough to be materially affected by the random aerodynamic forces to which it is exposed, and the fragmentation of the tail portion creating the break off remnant will generally have occurred sufficiently far from the print medium destination to provide an opportunity for those forces to alter the flight path of the satellite drop. In practice, the size of the break off remnants and the time at which break off occurs are largely affected by the interaction between three factors 1) inertial forces at work or "drag", 2) the viscosity of the ink, and 3) the surface tension of the ink.

Accordingly, it is recognized that a substantial need exists to reduce or eliminate the formation of aerosol effects and satellite drops (and thus, satellite spotting on print media) in ink-jet printing through the manipulation of the three factors mentioned above. Such an endeavor is made difficult by the fact that often one of these three factors may not be optimized without adversely affecting another. In particular, fluid friction or drag in ink-jet inks have typically been thought to be inversely proportionate to viscosity and surface tension. Additionally, any composition or method for accomplishing these goals should provide a solution wherein the ink-jet ink composition is sufficiently stable in an aqueous solution so as to be practical in a commercial application.

SUMMARY OF THE INVENTION

The present invention is drawn to an aqueous based ink-jet ink composition and a method for printing images exhibiting reduced satellite spotting (in size and amount), by employing effective amounts of certain high molecular weight polysaccharides. Specifically, an aqueous inkjet ink composition exhibiting a reduction in aerosol formation during printing is disclosed, comprising an ink vehicle; an effective amount of at least one ink colorant; and from 5 to 200 ppm of a high molecular weight polysaccharide. Similarly, a method of printing an image on a substrate with reduced satellite spotting around the image on the substrate comprises the steps of formulating an ink-jet ink composition described above, followed by jetting the ink-jet ink composition from an ink-jet pen, wherein aerosol formation of the ink-jet ink composition is substantially reduced resulting in a substantial reduction is satellite spotting around the image. Further, a system for producing ink-jet ink images having reduced satellite spotting comprises an ink-jet ink composition comprising an effective amount of an ink vehicle, an effective amount of at least one ink colorant, and from 5 to 200 ppm by weight of a high molecular weight polysaccharide; and an ink-jet pen containing said ink-jet ink composition, said ink-jet pen configured to jet said ink-jet ink composition onto a substrate. With the composition, method, or system described herein, the polysaccharide can have an average molecular weight from about 200,000 to 5,000,000, preferably from 1,000,000 to 5,000,000.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not to be limiting because the scope of the present invention is intended to be limited only by the appended claims and equivalents thereof.

In describing and claiming the present invention, the following terminology will be used.

The singular forms "a," "an," and, "the" include plural referents unless the context clearly dictates otherwise. Thus, for example, reference to "a dye" includes reference to one or more of such dyes, reference to "an ink" includes reference to one or more of such inks, and reference to "the color" includes reference to a mixture of one or more of such colors.

As used herein, "effective amount" refers to the minimal amount of a substance or agent, which is sufficient to achieve a desired effect. For example, an effective amount of an "ink vehicle" is the minimum amount required in order to create ink, which will meet the specified performance and characteristic standards. Additionally, the minimum amount of an "ink colorant" would be the minimum amount, which can still achieve the specified performance and characteristic standards.

As used herein, "ink vehicle," refers to the vehicle in which a dye and polysaccharides are placed to form ink. Ink vehicles are well known in the art, and a wide variety of ink vehicles may be used to form ink compositions that are useful in the present invention. Such ink vehicles may include a mixture of a variety of different agents, including without limitation, surfactants, solvents, co-solvents, buffers, biocides, viscosity modifiers, surface-active agents, and water.

As used herein, "ink colorant," refers to a dye or pigment, or a mixture thereof, whether inorganic or organic, the addition of which gives a desired color to an ink composition.

The terms "formulation" and "composition" may be used interchangeably herein. The terms "print media," "print surface," and "substrate" may be used interchangeably herein, and refer to a surface to which ink is applied to support an image.

"High molecular weight" when referring to a polysaccharide shall include all molecular weights as would be apparent to those skilled in the art, and shall minimally include polysaccharides having molecular weights from 200,000 to 5,000,000, preferably from 1,000,000 to 5,000,000.

With this in mind, an embodiment of the present invention is drawn to an aqueous ink composition for use in ink-jet printing comprising an effective amount of an ink vehicle, an effective amount of an ink colorant, and from 5 to 200 ppm of a high molecular weight polysaccharide. Additionally, a method of printing an image on a substrate with reduced satellite spotting around the image can comprise the steps of formulating an ink-jet ink composition comprising an effective amount of an ink vehicle, an effective amount of an ink colorant, and from 5 to 200 ppm of a high molecular weight polysaccharide; and jetting said ink-jet ink composition from an ink-jet pen, wherein aerosol formation of the ink-jet ink composition is substantially reduced resulting in a substantial reduction is satellite spotting around the image. Further, a system for producing ink-jet ink images having reduced satellite spotting comprises an ink-jet ink composition having an effective amount of an ink vehicle, an effective amount of at least one ink colorant, and from 5 to 200 ppm by weight of a high molecular weight polysaccharide; and an ink-jet pen containing said ink-jet ink composition, wherein the ink-jet pen is configured to jet the ink-jet ink composition onto a substrate. The ink-jet pen can be either a thermal ink-jet pen or a piezo ink-jet pen, for example.

With ink jet ink compositions, methods, and systems of the present invention, a substantial reduction in aerosol formation can be realized. Thus, a reduction in satellite spotting can also be realized. Though not strictly required, the high molecular weight polysaccharides can have an average molecular weight from 200,000 to 5,000,000, and more preferably, the average molecular weight can be from 1,000,000 to 5,000,000. In a more detailed aspect of the invention, in one embodiment, the high molecular weight polysaccharide can be present at from 10 to 80 ppm, and more preferably from 15 to 50 ppm. Additionally, though not required, it is preferred that the high molecular weight polysaccharides used in the ink-jet inks and methods of the present invention have a Trouton ratio from about 3 to 10. A Trouton ratio is a ratio of elongational (or extentional viscosity) to shear viscosity. By utilizing the amounts of the high molecular weight polysaccharide components disclosed and described herein, reduced turbulent fluid friction or drag is experienced while, in many cases, increased extensional viscosity and surface tension of the ejected ink droplet can also be realized. Thus, the amount of aerosol present upon printing can be reduced, which ultimately leads to reduced satellite spotting.

Turbulent fluid friction is a measurement of a fluid's resistance to movement caused by the molecular attraction between a fluid material and another material over which the fluid material moves. Increased turbulent fluid friction or "drag" in ink-jet inks tends to increase the amount of aerosol effect experienced as it can reduce the speed at which an ink-jet ink droplet is expelled, thereby causing the droplet to remain airborne for a longer period of time. Additionally, this tends to make the droplet more susceptible to random aerodynamic forces during flight. Thus, to experience reduced aerosol effects turbulent fluid friction can be reduced, thereby allowing the ink-jet ink to be expelled at greater speeds for a given pressure.

Viscosity is a quality of fluids that prevents the fluid from flowing when subjected to a force. In the same sense, surface tension is the tendency of a given liquid to reduce its exposed surface to the smallest possible area (typically causing liquids to form a sphere when airborne). Thus, in order to experience reduced aerosol effects, both extensional viscosity and surface tensions of an ink-jet droplet can be increased above base solution levels, thereby creating an ink-jet droplet, which is more spherical upon ejection and more likely to remain intact during flight. A more spherical form reduces the tail portion of the ink-jet droplet, which portion is more susceptible to random aerodynamic forces and therefore more likely to be pulled apart by extrinsic forces. Additionally, a more spherical droplet tends to increase the likelihood that the tail portion will remain intact and aerosol formation will be minimized.

Similarly, even if a significant tail portion remains present and fragments, by increasing extensional viscosity and surface tension to desired levels, the point of fragmentation can be moved farther from the head of the droplet, thereby delaying fragmentation such that any break off remnants occur closer to the print medium. This further reduces the amount of satellite spotting experienced, because the closer the break off remnants occur to the print media, the less likely they are to be affected by random aerodynamic forces. As such, break off remnants are more likely to be deposited in their intended position on the print media. Still further, by increasing the levels of extensional viscosity and surface tension, any ink that does break away from the tail portion of an ink-jet droplet is more likely to form satellite drops of sufficient size and mass that their trajectories are not dominated by random aerodynamic forces.

In the prior art, certain disclosures teach that both extensional and shear viscosity, as well as surface tension levels may be increased through the addition of large amounts of certain polymers, including polysaccharides. However, such disclosures demonstrated the use of polysaccharides in amounts far greater than those presently disclosed. In practice, reliance on the large amounts of polysaccharides to control viscosity and surface tension provided inks that sacrificed certain desired ink and printing characteristics. Specifically, turbulent fluid friction was increased to allow for increased viscosity and surface tension. With greater amounts of polysaccharides present, ink-jet droplets were expelled at slower speed, making them more susceptible to random aerodynamic forces. It was surprising to discover that by adding polysaccharides in such low concentrations, good turbulent fluid friction and viscosity could be achieved, while improving these inks in the area of ink drop velocity. Further, until the present invention, it was believed that turbulent fluid friction in ink-jet inks could not be reduced (below base solution levels) while increasing viscosity and surface tension.

The present invention provides an unexpected improvement wherein, through the addition of minute amounts of certain high molecular weight polysaccharide components having the appropriate characteristics, turbulent fluid friction in an ink-jet ink can be reduced, while maintaining conventional viscosity and surface tension within the ink. Thus, the composition can flow faster for a given applied pressure, which provides better drop ejection, and which reduces the creation of satellite drops (in size and/or amount) and aerosol effects. Also, the high molecular weight polysaccharides disclosed in the present invention differ from those polysaccharides previously disclosed in connection with ink-jet inks, in that they are included at a much lower concentration.

Examples of specific high molecular weight polysaccharides that can be used in accordance with the present invention include, but are not limited to, the following, all of which are available from CP Kelco Polymer Corporation: XANTHAM Gum, WELAN Gum, GELAN Gum, RHAMSAN, KELTONE LV, KETONE HV, and KELTROL T. This list provides trade names for high molecular weight polysaccharides as defined herein, and as is known by those skilled in the art. Other high molecular weight polysaccharides can also be used in accordance with the present invention, provided they are present in the ink-jet inks in amounts from 5 to 200 ppm.

Though the primary focus of the present invention is related to the addition of very small amounts of high molecular weight polysaccharides, the colorant and vehicle components are also important components. For example, to impart color to the ink-jet ink composition, one or more pigment and/or dye must be added. Additionally, appropriate ink vehicle components are added to provide acceptable ink-jet ink properties. For example, in one embodiment, the ink colorant can be present in the ink-jet ink formulation at from 0.05% to 2% solid by weight, though any functional amount can be used. Examples of ink colorants that can be used include, but are not limited to, Food Black 2, Carta Black, Direct Black 19, Direct Black 51, Direct Black 109, Direct Black 154, Direct Black 86, Direct Blue 199, Direct Red 9, Direct Red 32, Acid Yellow 23, Acid Blue 185, Acid Blue 9, Acid Red 17, Acid Red 52, Acid Red 249, Reactive Red 180, Magenta 377, and combinations thereof.

In a more detailed aspect of the present invention, the ink-jet ink composition or the ink-jet ink composition used within the method of the present invention can be formulated having from 0.05% to 2% solid by weight of an ink colorant; from 8% to 30% by weight of at least one lower alkyl diol; from 0% to 2% by weight of a buffer; from 0% to 0.3% by weight of a biocide; and about 0.005% to 0.01% by weight of at least one high molecular weight polysaccharide. What is meant by "solid" when referring to the colorant is the percentage of solid by weight within a dye or pigment concentrate. For example, if an ink-jet ink contained 13.8% by weight of Magenta 377 dye concentrate, it would contain dye solids within the above prescribed range, i.e., from 0.05% to 2% by weight. Additionally, what is meant by lower alkyl diol is any diol having from 2 to 10 carbon atoms arranged in straight chains or branched chains, with 1,2-hexanediol and 1,2-pentanediol being preferred for use. Notably, the buffer and the biocide can be present in small amounts, or do not have to be present at all. Examples of appropriate buffers that can be used include, but are not limited to, 4-morpholine propanesulfonic acid (MOPS), sodium bicarbonate, triethanolamine, dimethylleucylglycine, and combinations thereof. Examples of appropriate biocides that can be used include, but are not limited to, benzoic acid, polysorbate, and combinations thereof. Additionally, a buffer sold under the trademark PROXEL along with other buffers and biocides can be used as would be apparent to one skilled in the art after considering the present specification. Additionally, other ink-vehicle components can also be present as desired for a specific application.

EXAMPLES

The following examples illustrate the embodiments of the invention that are presently best known. However, it is to be understood that the following arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and the following Examples provide further detail in connection with what are presently deemed to be the most practical and preferred embodiments of the invention, it will be apparent to those skilled in the art that numerous modifications, including, but not limited to, variations in size, materials, shape, form, function and manner of operation, assembly and use may be made without departing from the principles and concepts set forth herein.

Example 1

An ink-jet ink having no added high molecular weight polysaccharide added was prepared using the following formulation:

9.75% by weight of 1,2-hexanediol 0.15% by weight of a buffer 0.2% by weight of a biocide 13.8% by weight of Magenta 377 dye concentrate 76.1% by weight water

Example 2

An ink-jet ink having 40 ppm of a high molecular weight polysaccharide was prepared using the following formulation:

9.75% by weight of 1,2-hexanediol 0.15% by weight of a buffer 0.2% by weight of a biocide 13.8% by weight of Magenta 377 dye concentrate 2.5% by weight of an aqueous solution containing 0.04% RHAMSAN 73.6% by weight water

Example 3

An ink-jet ink having 26 ppm of a high molecular weight polysaccharide was prepared using the following formulation:

9.75% by weight of 1,2-hexanediol 0.15% by weight of a buffer 0.2% by weight of a biocide 13.8% by weight of Magenta 377 dye concentrate 4.5% by weight of an aqueous solution containing 0.04% RHAMSAN 71.6% by weight water

Example 4

An ink-jet ink having 18 ppm of a high molecular weight polysaccharide was prepared using the following formulation:

9.75% by weight of 1,2-hexanediol 0.15% by weight of a buffer 0.2% by weight of a biocide 13.8% by weight of Magenta 377 dye concentrate 6.5% by weight of an aqueous solution containing 0.04% RHAMSAN 69.6% by weight water

Example 5

An ink-jet ink having 10 ppm of a high molecular weight polysaccharide was prepared using the following formulation:

9.75% by weight of 1,2-hexanediol 0.15% by weight of a buffer 0.2% by weight of a biocide 13.8% by weight of Magenta 377 dye concentrate 10.0% by weight of an aqueous solution containing 0.04% RHAMSAN 66.1% by weight water

Example 6

To demonstrate the reduced aerosol effect exhibited by the addition of a high molecular weight polysaccharide to a dye based ink-jet ink, the following test was conducted. Five ink-jet inks were prepared according to Examples 1 to 5, each containing varying amounts of a high weight polysaccharide solution commercially known as RHAMSAN. Five ink-jet ink pens were filled with the above mentioned inks and was ejected onto C3833A Hewlett Packard glossy paper at 30 inches per second. The satellite spots were observed by use of a low power microscope. The following results were recorded:

TABLE 1

| Example No. | Polysaccharide Conc. (ppm) | Average Satellite Drop Size (mils) |
|---|---|---|
| 1 | 0 | 1.35 |
| 2 | 10 | 0.59 |
| 3 | 18 | 0.62 |
| 4 | 26 | 0.60 |
| 5 | 40 | 0.62 |

As can be seen, the addition of a minute amount of a high molecular weight polysaccharide reduced the size of satellite spots that appeared during printing by more than 50%.

Example 7

To demonstrate the increased ink drop velocity experienced due to reduced turbulent fluid friction exhibited by a dye based ink-jet ink containing high molecular weight polysaccharides, ink-jet inks were prepared according to Examples 1 to 5 containing varying amounts of a high molecular weight polysaccharide commercially referred to as RHAMSAN. An ink-jet pen was filled with the above-mentioned inks after which, the inks were ejected through a chronograph to measure ink drop velocity. The following results were recorded:

TABLE 2

| Example No. | Polysaccharide Conc. (ppm) | Ink Drop Velocity (m/sec) |
|---|---|---|
| 1 | 0 | 12.40 |
| 2 | 10 | 12.43 |
| 3 | 18 | 12.54 |
| 4 | 26 | 12.84 |
| 5 | 40 | 12.40 |

As can be seen, the addition of a minute amount of a high molecular weight polysaccharide increased the ink drop velocity in most of the inks tested, with the best velocity being shown with the ink-jet ink of Example 4, i.e., 26 ppm.

Example 8

Five ink-jet inks were prepared by admixing varying amounts of a high weight polysaccharide solution containing a polysaccharide commercially known as RHAMSAN to five separate units of pigmented ink bearing Hewlett Packard Part Number C1893. Specifically, 0% (resulting in 0 ppm), 2.5% (resulting in 10 ppm), 4.5% (resulting in 18 ppm), 6.5% (resulting in 26 ppm), and 10% (resulting in 40 ppm) were added by total composition weight to the five separate units of C1983.

Example 9

To demonstrate the reduced aerosol effect exhibited through the addition of a high molecular weight polysaccharide to a pigment based ink-jet ink, the following test was conducted. Five of the same ink-jet pens were filled respectively with the five above mentioned inks describe in Example 8. The inks were then ejected onto C3833A Hewlett Packard glossy paper at 30 inches per second, and the satellite drops were observed by use of a low power microscope. The following results were recorded:

TABLE 3

| Polysaccharide Conc. (ppm) | Average Satellite Drop Size (mils) |
|---|---|
| 0 | 0.90 |
| 10 | 0.55 |
| 18 | 0.50 |
| 26 | 0.49 |
| 40 | 0.55 |

As can be seen, the addition of a high molecular weight polysaccharide to a pigment-based ink-jet significantly reduced the size of satellite spots experienced during printing when compared to the size experienced at base solution levels, i.e., 0 ppm polysaccharide.

Example 10

To demonstrate the increased ink drop velocity experienced due to reduced turbulent fluid friction exhibited by a pigment based ink-jet ink containing high molecular weight polysaccharides, ink-jet inks were prepared in accordance with Example 8. An ink-jet pen was filled with the above-mentioned inks after which, the inks were ejected through a chronograph to measure ink drop velocity. The following results were recorded:

TABLE 4

| Polysaccharide Conc. (ppm) | Ink Drop Velocity (m/sec) |
| --- | --- |
| 0 | 11.46 |
| 10 | 10.31 |
| 18 | 11.65 |
| 26 | 11.30 |
| 40 | 9.94 |

As can be seen, the addition of a high molecular weight polysaccharide increased the ink drop velocity at about 18 ppm, with acceptable results at other concentrations. At 40 ppm concentration, the polysaccharide appears to have increased the conventional viscosity too much to fully benefit from the fluid friction reduction (drag reduction) of the polysaccharide. However, the results can still within acceptable limits under some circumstances.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. An aqueous ink-jet ink composition exhibiting a reduction in aerosol formation during printing, comprising:
   a) an ink vehicle;
   b) at least one ink colorant; and
   c) from 5 to 200 ppm by weight of an aerosol formation reducing high molecular weight polysaccharide.

2. An ink-jet ink composition as in claim 1 wherein said polysaccharide has an average molecular weight from 200,000 to 5,000,000.

3. An ink-jet ink composition as in claim 2 wherein said polysaccharide has an average molecular weight from 19000,000 to 5,000,000.

4. An ink-jet ink composition as in claim 1 wherein said polysaccharides have a Trouton ratio from about 3 to 10.

5. An ink-jet ink composition as in claim 1 wherein said polysaccharide is present at from 10 ppm to 80 ppm by weight.

6. An ink-jet ink composition as in claim 5 wherein said polysaccharide is present at from 15 ppm to 50 ppm by weight.

7. An ink-jet composition as in claim 1 wherein said ink colorant is a member selected from the group consisting of Food Black 2, Carla Black, Direct Black 19, Direct Black 51, Direct Black 109, Direct Black 154, Direct Blue 86, Direct Blue 199, Direct Red 9, Direct Red 32, Acid Yellow 23, Acid Blue 185, Acid Blue 9, Acid Red 17, Acid Red 52, Acid Red 249, Reactive Red 180, Magenta 377, and combinations thereof.

8. An ink-jet ink composition as in claim 1, comprising:
   a) from 0.05% to 2% solid by weight of an ink colorant;
   b) from 8% to 30% by weight of at least one lower alkyl diol;
   c) from 0% to 2% by weight of a buffer;
   d) from 0% to 0.3% by weight of a biocide; and
   e) about 5 to 200 ppm by weight of at least one high molecular weight polysaccharide.

9. A method of printing an image on a substrate with reduced satellite spotting around the image on the substrate, comprising:
   a) providing an ink-jet ink composition, comprising:
      (i) an ink vehicle; and,
      (ii) an ink colorant; and,
      (iii) from 5 to 200 ppm by weight of an aerosol formation reducing high molecular weight polysaccharide; and
   b) jetting said ink-jet ink composition from an ink-jet pen, wherein aerosol formation of the ink-jet ink composition is substantially reduced resulting in a substantial reduction is satellite spotting around the image.

10. A method as in claim 9 wherein said polysaccharide has an average molecular weight from about 200,000 to 5,000,000.

11. A method as in claim 9 wherein said polysaccharide has a Trouton ratio from about 3 to 10.

12. A method as in claim 9 wherein said polysaccharide is present at from 10 ppm to 80 ppm.

13. A method as in claim 12 wherein said polysaccharide is present at from 15 ppm to 50 ppm.

14. A method as in claim 9 wherein said ink colorant is a member selected from the group consisting of Food Black 2, Carta Black, Direct Black 19, Direct Black 51, Direct Black 109, Direct Black 154, Direct Blue 86, Direct Blue 199, Direct Red 9, Direct red 32, Acid Yellow 23, Acid Blue 185, Acid Blue 9, Acid Red 17, Acid Red 52, Acid Red 249, Reactive Red 180, Magenta 377, and combinations thereof.

15. A method as in claim 9 wherein said ink vehicle comprises:
   a) from 0.05% to 2% solid by weight of an ink colorant;
   b) from 8% to 30% by weight of at least one lower alkyl diol;
   c) from 0% to 2% by weight of a buffer;
   d) from 0% to 0.3% by weight of a biocide; and
   e) from 5 to 200 ppm by weight of at least one high molecular weight polysaccharide.

16. A system for producing ink-jet ink images having reduced satellite sporting, comprising:
   a) an ink-jet ink composition comprising:
      (i) an ink vehicle,
      (ii) at least one ink colorant, and
      (iii) from 5 to 200 ppm by weight of an aerosol formation reducing high molecular weight polysaccharide; and
   b) an ink-jet pen containing said ink-jet ink composition, said ink-jet pen configured to jet said ink-jet ink composition onto a substrate.

17. A system as in claim 16 wherein said polysaccharide has an average molecular weight from about 200,000 to 5,000,000.

18. A system as in claim 16 wherein said polysaccharide is present at from 10 ppm to 80 ppm by weight.

19. A system as in claim 18 wherein said polysaccharide is present at from 15 ppm to 50 ppm by weight.

20. A system as in claim 16 wherein the ink-jet pen is selected from the group consisting of a thermal ink-jet pen and a piezo ink-jet pen.

* * * * *

UNITED STATES PATENT AND TRADEMARK OFFICE
CERTIFICATE OF CORRECTION

PATENT NO. : 6,790,268 B2
DATED : September 14, 2004
INVENTOR(S) : Lee et al.

It is certified that error appears in the above-identified patent and that said Letters Patent is hereby corrected as shown below:

Column 9,
Line 48, delete "19000,000" and insert therefor -- 1,000,000 --.
Line 58, delete "Carla" and insert therefor -- Carta --.

Column 10,
Line 18, delete "is" and insert therefor -- in --.

Signed and Sealed this

Twelfth Day of April, 2005

JON W. DUDAS
*Director of the United States Patent and Trademark Office*